No. 625,529. Patented May 23, 1899.
F. R. ANDRESS.
NUT LOCK.
(Application filed Feb. 4, 1899.)
(No Model.)

Witnesses
Edward E. Rowland.
M. F. Keating

Inventor
Fred R. Andress
By his Attorney
Charles J. Kintner

UNITED STATES PATENT OFFICE.

FRED R. ANDRESS, OF SPARTA, NEW JERSEY.

NUT-LOCK.

SPECIFICATION forming part of Letters Patent No. 625,529, dated May 23, 1899.

Application filed February 4, 1899. Serial No. 704,601. (No model.)

*To all whom it may concern:*

Be it known that I, FRED R. ANDRESS, a citizen of the United States, residing at Sparta, in the county of Sussex and State of New Jersey, have made a new and useful Invention in Nut-Locks, of which the following is a specification.

The invention will be fully understood by referring to the accompanying drawings, in which—

Figure 1:
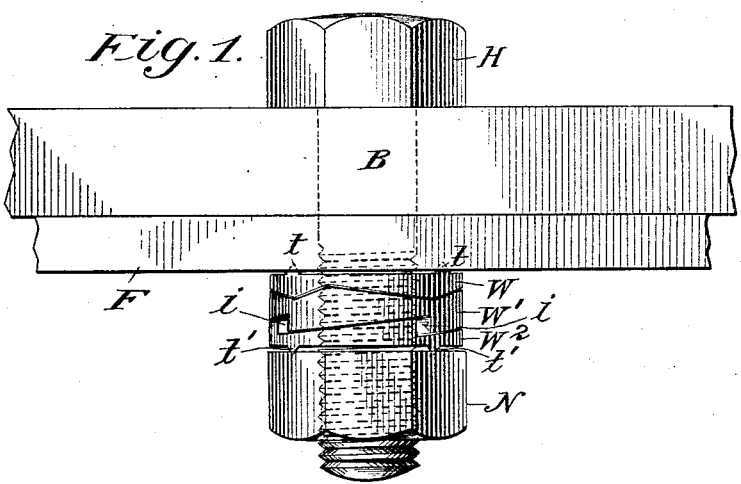
Figure 2:
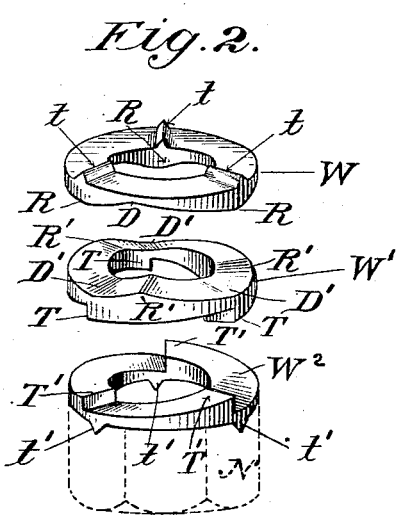

Figure 1 is a plan view of a bolt and nut securing two bars together, my novel nut-lock being illustrated in connection therewith; and Fig. 2 is a perspective view of the novel nut-lock, illustrated in three detachable parts.

Referring to the drawings in detail and first to Fig. 1, B and F represent two bars designed to be secured together by a bolt having a head H and nut N.

W W' W² represent my novel nut-lock, consisting of individual interlocking washers, the inner washer W being provided on one face with three radially-disposed indenting-teeth $t\ t\ t$, located at equal distances apart, and on the other with three ridges R R R of equal height and similar opposite inclinations and intermediate depressions D D D of equal depth.

W' represents the second washer, provided on one face with three ridges R' R' R' and three intermediate depressions D' D' D', said ridges and depressions conforming or corresponding with the ridges and depressions R R R and D D D of the washer W. The washer W' is provided on its other face with three radially-disposed ratchet-teeth T T T, having inclined planes between them.

The third washer W² is provided on one face with three radially-disposed ratchet-teeth T' T' T', having their inclinations in opposite directions to the teeth T T T of the washer W' and inclined planes between them, as before. This third washer W² is provided on its opposite face with three radially-disposed indenting-teeth $t'\ t'\ t'$, located at equal distances apart and corresponding with the like indenting-teeth $t\ t\ t$ on the inner face of the first washer W.

N represents the nut. (Shown in full lines in Fig. 1.) Instead of constructing three individual washers W, W', and W², the outer washer W² having radially-disposed indenting-teeth $t'\ t'\ t'$ and ratchet-teeth T' T' T', the nut itself may have its inner face provided with such ratchet-teeth, if preferred, thus doing away with one of the washers.

The operation of my novel nut-lock is as follows: The bolt is put in place through the two bars B and F to be secured together, as shown in Fig. 1, and the interlocking washers W W' W² slipped thereon in the manner shown. The nut N is then placed upon the bolt and screwed home or until the ratchet-teeth T' T' T' of the washer W² take against the opposing ratchet-teeth T T T of the washer W'. When this takes place, the ridges R' R' R' of the washer W' are caused to be forced forward against the corresponding ridges of the washer W, thus establishing a wedging action between these two washers W W' and causing the indenting-teeth $t\ t\ t$ on the one side of the washer W to cut into or enter the bar F and the indenting-teeth $t'\ t'\ t'$ of the washer W² to cut into or enter in like manner the inner face of the nut N. Consequently as the nut is advanced the indenting-teeth $t\ t\ t$ and $t'\ t'\ t'$ will enter said faces to the desired depth to securely hold the washers W and W² to the bar F and nut N. This forward movement of the nut is continued until the ridges R' R' R' of the washer W' pass entirely over the ridges R R R into the succeeding set of depressions D D D, assuming the position shown in Fig. 1, after which the wrench is applied to the nut N in a reverse direction, causing the ratchet-teeth T' T' T' of the washer W² to be separated from the corresponding ratchet-teeth T T T of the washer W' and to ascend the inclined planes between said ratchet-teeth until a space occurs between the washers W' W², as indicated by the letters $i\ i$, Fig. 1, of such a breadth as will be necessary to give to the interlocking parts the desired strain. It will be seen, therefore, that in the operation of my novel nut-lock by reason of the action of the several sets of inclined planes due, respectively, to the ridges R R R R' R' R', depressions D D D D' D' D', and ratchet-teeth T T T T' T' T' of the several washers, there is produced an interlocking action such that there is no possibility of the nut N becoming removed except under the influence of a wrench.

When it is required to remove the nut, it is, of course, only necessary to apply the wrench thereto in the necessary direction and with sufficient force to cause the inclined planes between the ratchet-teeth T T T T' T' T' to pass each other, after which it may be easily removed in the ordinary manner.

In Fig. 2 I have illustrated in dotted lines how the outer washer $W^2$ may be done away with by constructing the entire nut N with inclined planes and radially-disposed ratchet-teeth T' T' T' on its inner face.

I do not limit myself to the specific details of construction herein shown and described in connection with my novel nut-lock.

I believe it is broadly new with me to devise a nut-lock having a plurality of washers between the nut and the part to be locked, the adjoining faces of said washers being provided with ridges and depressions in the nature of oppositely-inclined planes, and the outer faces of the washers adjacent to one of the parts to be bolted, the inner face of the nut being provided with indenting-teeth, adapted to sink into and lock said parts securely together when the nut is turned to its full straining limit.

Having thus described my invention, what I claim, and desire to secure by Letters Patent of the United States, is—

1. A nut-lock composed of three interlocking washers, the central washer being provided on one face with ridges R' R' R' and depressions D' D' D' and on the other with ratchet-teeth T T T, the adjacent washers being provided, on their inner faces, respectively with ridges R R R and depressions D D D and oppositely-disposed ratchet-teeth $t\ t\ t\ t'\ t'\ t'$, substantially as described.

2. A nut-lock having a plurality of interlocking washers provided each with corresponding ridges of equal height and similar opposite inclinations and depressions of equal depth, two of said washers having oppositely-disposed ratchet-teeth, the outer pair of said washers being provided with indenting-teeth adapted to be sunk or depressed respectively into the nut and one of the parts to be secured by the bolt to which the nut is applied, substantially as described.

3. A nut-lock consisting of three washers W W' $W^2$, the washers W and W' having ridges and depressions of equal height and depth and similar opposite inclinations in their adjacent faces, the washer W' being provided on its other face with ratchet-teeth T T T; the third washer $W^2$ having on one face ratchet-teeth T' T' T' oppositely inclined with relation to the ratchet-teeth T T T of the washer W'; the washers W and $W^2$ being provided respectively, on their outer faces, with radially-disposed indenting-teeth $t\ t\ t, t'\ t'\ t'$, substantially as described and shown.

In testimony whereof I have hereunto subscribed my name this 2d day of February, 1899.

FRED R. ANDRESS.

Witnesses:
C. J. KINTNER,
O. J. CONLEY.